United States Patent
Begen et al.

(10) Patent No.: US 10,070,348 B2
(45) Date of Patent: Sep. 4, 2018

(54) HYPERTEXT TRANSFER PROTOCOL SUPPORT OVER HYBRID ACCESS

(71) Applicant: CISCO TECHNOLOGY, INC., San Jose, CA (US)

(72) Inventors: Ali C. Begen, London (CA); Daniel G. Wing, San Jose, CA (US); Srinath Gundavelli, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 107 days.

(21) Appl. No.: 15/139,206

(22) Filed: Apr. 26, 2016

(65) Prior Publication Data

US 2017/0311209 A1  Oct. 26, 2017

(51) Int. Cl.
| H04L 12/26 | (2006.01) |
| H04W 36/00 | (2009.01) |
| H04L 12/741 | (2013.01) |
| H04W 88/16 | (2009.01) |

(52) U.S. Cl.
CPC ....... *H04W 36/0022* (2013.01); *H04L 45/745* (2013.01); *H04W 88/16* (2013.01)

(58) Field of Classification Search
CPC .................................................... H04L 45/24
See application file for complete search history.

(56) References Cited

U.S. PATENT DOCUMENTS

| 6,976,189 | B1 * | 12/2005 | Schoenthal | G06F 11/3672 714/35 |
| 9,769,062 | B2 * | 9/2017 | Li-On | H04L 45/24 |
| 2006/0259605 | A1 * | 11/2006 | Altenhofen | H04L 69/08 709/223 |
| 2009/0313325 | A1 * | 12/2009 | Vanecek | G06F 15/16 709/203 |
| 2011/0131348 | A1 * | 6/2011 | Onozuka | G05B 15/02 710/30 |
| 2014/0162680 | A1 * | 6/2014 | Kotecha | H04W 28/08 455/453 |
| 2014/0213219 | A1 | 7/2014 | Mohebbi | |
| 2015/0094063 | A1 | 4/2015 | Hu et al. | |
| 2015/0295738 | A1 | 10/2015 | Mori et al. | |
| 2016/0094608 | A1 * | 3/2016 | Sundararajan | H04L 65/80 709/219 |

OTHER PUBLICATIONS

Leymann, et al., "Hybrid Access Network Architecture," Network Working Group, Internet-Draft, Jan. 14, 2015, 15 pages; https://tools.ietf.org/pdf/draft-lhwxz-hybrid-access-network-architecture-02.pdf.

Seite, et al., "MAG Multipath Binding Option," DMM WG, Internet-Draft, Oct. 19, 2015, 13 pages; https://tools.ietf.org/pdf/draft-seite-dmm-rg-multihoming-02.pdf.

* cited by examiner

*Primary Examiner* — Kevin C Harper

(57) ABSTRACT

A method is provided in one example embodiment and includes receiving at a first network node a request to obtain data from a second network node, wherein the first and second network nodes are connected via n access networks; partitioning the request into n subrequests proportionally based on relative throughputs of the n access networks; and transmitting each of the n subrequests to the second network node via a respective one of the n access networks.

20 Claims, 6 Drawing Sheets

HYPERTEXT TRANSFER PROTOCOL SUPPORT OVER HYBRID ACCESS

TECHNICAL FIELD

This disclosure relates in general to the field of communications networks and, more particularly, to techniques for providing improved Hypertext Transfer Protocol ("HTTP") support over hybrid access in connection with such communications networks.

BACKGROUND

In geographic areas in which Digital Subscriber Line ("DSL") and/or other older relatively slower fixed access networks have already been deployed, it may be difficult for operators to update or rebuild existing fixed access networks, due to financial costs and/or difficulties related to geographic location. Fiber to the Home ("FTTH") may be an option in certain cases; however, it is expensive and may not be deployable in some geographic locations (e.g., rural areas). On the other hand, the ever-growing demand for increased bandwidth may weighs heavily in favor of upgrading such access networks. While upgrading to fiber may not pay off in many locations, deploying high-speed mobile access, such as city-wide WiFi, 3G+, 4G, LTE, and beyond, in such locations has proven less painful and the ROI time has been considerably shorter, making this approach more favorable. In accordance with this trend, many operators are now looking into using their fixed and mobile access networks simultaneously to improve the services they are offering to their customers. This is referred to as "hybrid access". Broadband Forum, IETF, and the communications industry in general are working on bringing hybrid access support to residential gateways. In general, hybrid access is a mechanism for bundling together multiple heterogeneous access networks. In this mechanism the Customer Premise Equipment ("CPE") is enhanced to support the multiple heterogeneous access networks simultaneously. The hybrid access mechanism needs to provide flexibility in deciding the paths over which to forward data traffic.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving at a first network node a request to obtain data from a second network node, wherein the first and second network nodes are connected via n access networks; partitioning the request into n subrequests proportionally based on relative throughputs of then access networks; and transmitting each of the n subrequests to the second network node via a respective one of the n access networks.

In certain embodiments, the request may be an HTTP GET request. Additionally, n may be equal to 2 and wherein a first one of the access networks comprises a fixed access network and a second one of the access networks comprises a high-speed mobile access network. The second network node may be one of a hybrid access gateway, a server, and a content delivery network ("CDN"). In some embodiments, the method may further include, subsequent to the receiving and prior to the partitioning, determining whether the received request is destined for a particular address, and if the received request is not destined for a particular address, omitting the partitioning. In other embodiments, the method may include, subsequent to the receiving and prior to the partitioning, determining whether the request is for a small object, and if the received request is for a small object, omitting the partitioning. The partitioning may further include subdividing each of the subrequests into m smaller subrequests before the transmitting.

Example Embodiments

To maximize the benefits of hybrid access, one has to use whatever capacity is available in an intelligent manner. For example, DSL access is inexpensive, but it is relatively slow. LTE access is expensive and often has a monthly bandwidth limit, but it can be very fast.

Figure 1:
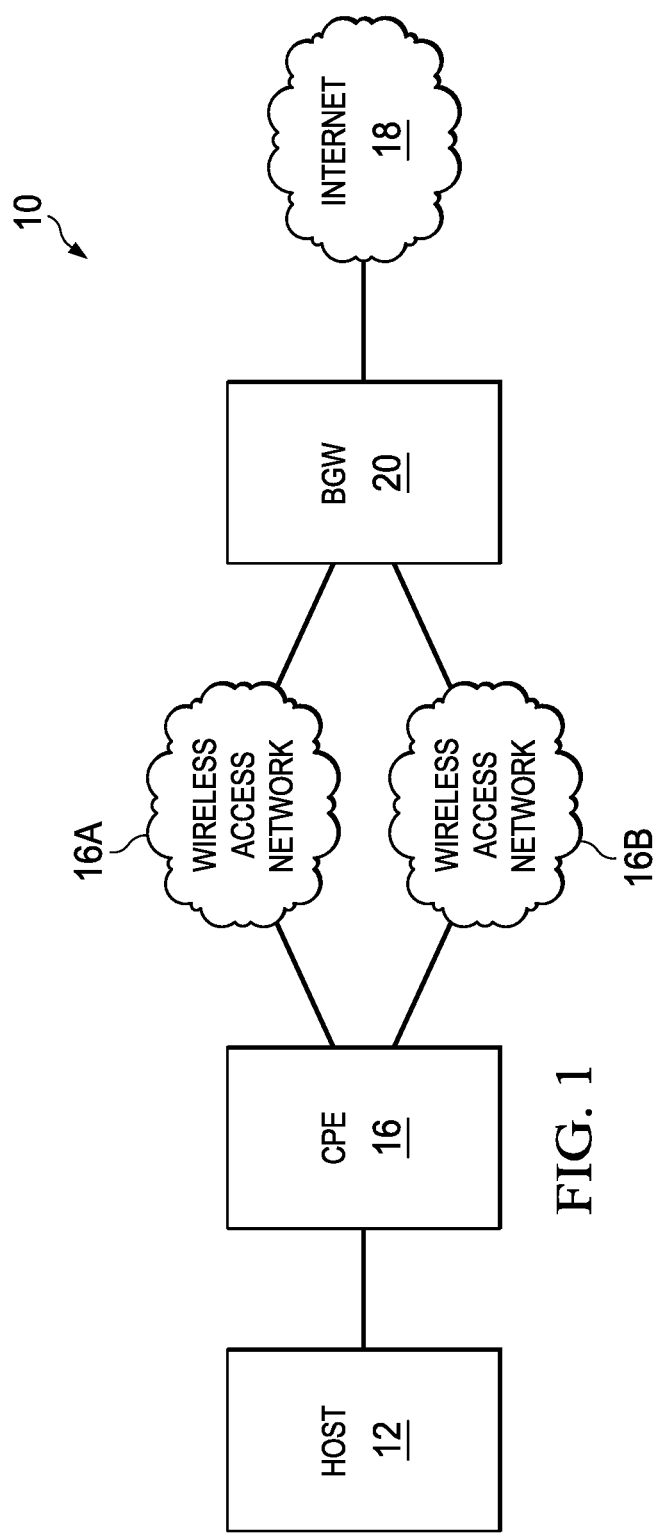
FIG. 1 illustrates a simplified block diagram of a hybrid access system environment in which flow based and packet based traffic distribution schemes may be implemented in accordance with embodiments described herein.

FIG. 1 illustrates simplified block diagram of a hybrid access system 10. As illustrated in FIG. 1, a host 12 at a customer site (which may be either a home or an enterprise) is connected to the Internet 18 through a CPE 14 that may provide connectivity through both a wireless access network 16A and a fixed access network 16B. In certain embodiments, the wireless access network 16A may comprise a cellular network (e.g., 3G, 4G, LTE) and the fixed access network 16B may comprise DSL. Because the CPE 14 is able to access the wireless network 16A, it is able to provide additional bandwidth to the host 12 when the fixed access network 16B is congested without requiring an upgrade to the fixed access network. As previously noted, upgrading a fixed access network may be costly and slow, especially in the areas with limited accessibility. Having the CPE 14 be able to take advantage of the bandwidth resources of wireless access network 16A and the fixed access network 16B concurrently is highly desirable for an operator, especially if the cellular network is not used at its fullest capacity.

In addition, providing connectivity through both a cellular access network and a fixed access network, as illustrated in FIG. 1, prevents hosts from suffering service interruption when the fixed access network fails. The CPE's ability to access the wireless access network 16A, as shown in FIG. 1, enhances reliability for the customer service connection.

Referring again to FIG. 1, in order to make use of both the wireless access network 16A and the fixed access network 16B, the CPE 14 of the customer should be connected to both networks such that the customer traffic may be routed over both these access networks simultaneously. The network architecture illustrated in FIG. 1 is flexible and may be extended to cover multiple access network combinations. To ensure that existing services are not negatively impacted by this architecture, certain traffic (e.g., Voice over IP, or "VoIP") should not be split over more than one path to guarantee required performance. This traffic may be kept in the fixed access network using traffic distribution policy, as described below.

As used herein, the following terms have the following meanings. CPE is a device that connects one or more hosts to provide connectivity to a service provider network. Hybrid access is the bundling of two or more access lines based on heterogeneous technologies (e.g., DSL and LTE) to provide to a residential or enterprise customer a higher bandwidth Internet connection. A Bundling Gateway ("BGW") is a service point that implements the bundling mechanism and provides a higher bandwidth Internet connection to the CPE from two or more heterogeneous access networks. The BGW is a logical function and may support packet reordering, as further described below. A path is a sequence of links between the CPE and the BGW.

As shown in FIG. 1, the host 12 is multi-homed, meaning it can access both access networks 16A, 16B through two interfaces, so it may use a different access network for each connection so those connections do not compete for network resources. Multi-homing enables the CPE, which may be a residential gateway, to benefit from redundancy, load balancing, load sharing, etc.

Figure 2:
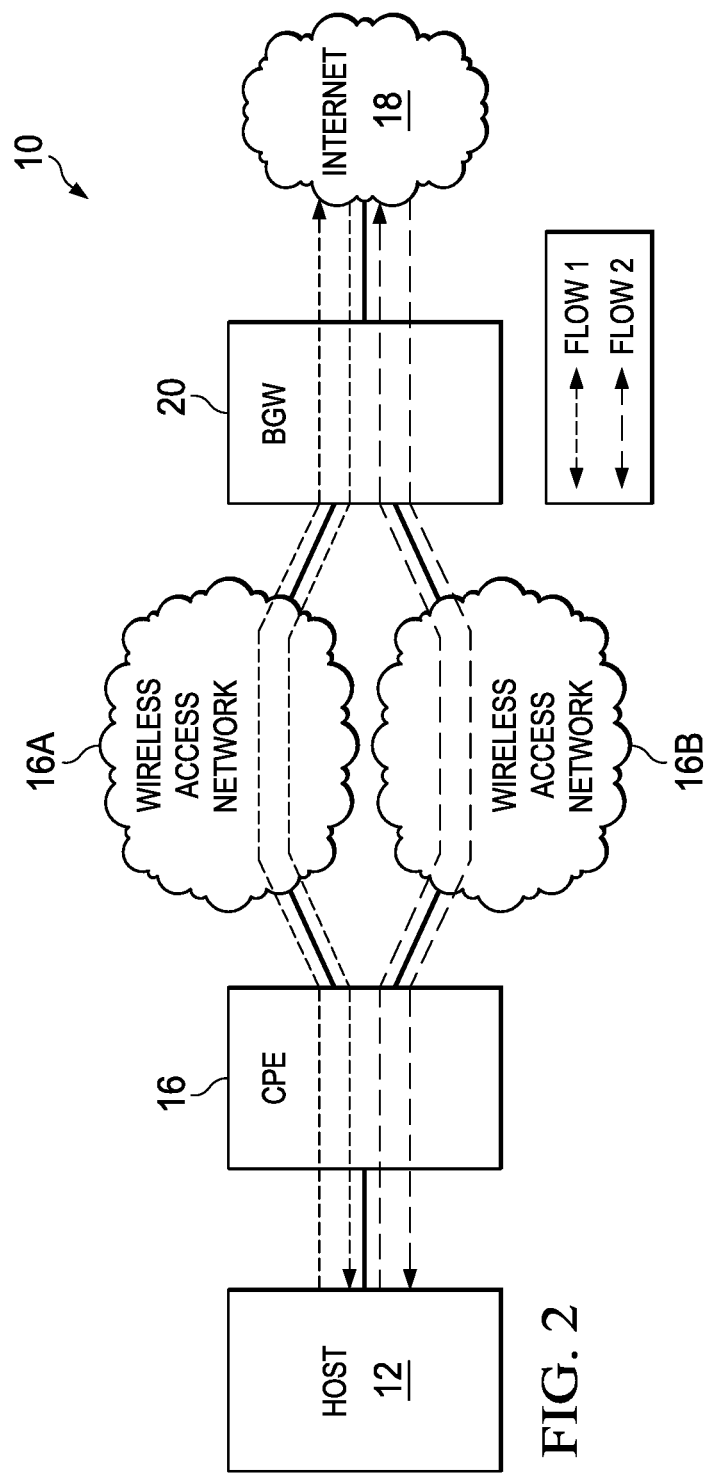
FIG. 2 a simplified block diagram of a flow based traffic distribution scheme in a hybrid access system environment in accordance with embodiments described herein.

Two different types of forwarding, or distribution schemes, may be applied to a hybrid access scenario, such as shown in and described with reference to FIG. 1. These two types of forwarding include flow-based forwarding and packet-based forwarding. In flow-based forwarding, illustrated in FIG. 2, forwarding policies are specified at the flow level. The customer traffic is classified in flows and each flow is associated to a single forwarding path. Packets belonging to a certain flow may be identified by their destination IP address, source IP address, IP protocol type, destination port, and source port (i.e., the 5-tuple), or by any other means. Upon receiving a packet from a host 12, Customer Premises Equipment ("CPE") 14, which may be, for example, a residential gateway, identifies the flow to which the packet belongs and forwards the packet in accordance with the policies specified for the identified flow. For example, the policy may dictate that a first flow ("Flow A") is to be forwarded to a wireless (e.g., 3G/4G) access network 16A and a second flow ("Flow B") is to be forwarded to a fixed (e.g., DSL) access network 16B. If one of the networks 16A, 16B, fails, CPE 14 may opt to forward the flows originally assigned to that network to the other access network.

It is relatively straightforward for CPE 14 to forward upstream traffic (i.e., traffic from host 12 to Internet 18) to pre-defined paths according to the flow based policies; however, the CPE cannot control the path over which downstream traffic will be routed. Deploying a bundling gateway ("BGW") or "hybrid access gateway," 20, as illustrated in FIG. 1, will resolve this issue. In certain embodiments, the hybrid access gateway 20 may apply the same flows classification policies as the CPE 14, thereby forwarding the downstream traffic to the proper one of the access networks 16A, 16B.

Figure 3:
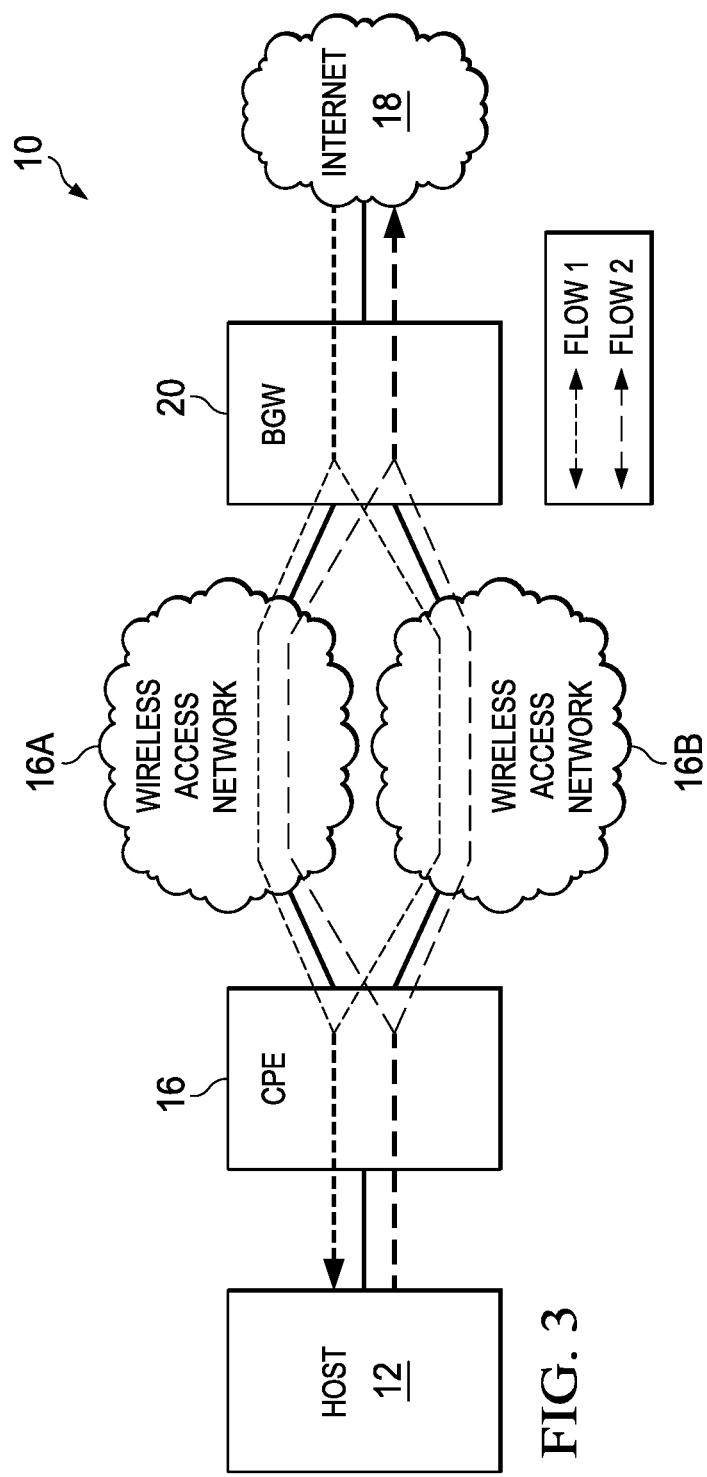
FIG. 3 a simplified block diagram of a packet based traffic distribution scheme in a hybrid access system environment in accordance with embodiments described herein.

In packet-based forwarding, illustrated in FIG. 3, forwarding policies are specified at the packet level. Packets belonging to the same flow may be forwarded over different access networks, as illustrated in FIG. 3. Packet-based forwarding enables the CPE 12 to control packet distribution over different access networks in a more flexible and fine-grained manner; however, packet-based forwarding may result in packets belonging to the same flow reaching their destination out of order. Because of this, a device, such as BGW 20, able to perform packet reordering at the remote (i.e., Internet) side may be required.

Flow-based forwarding is very similar to load balancing and is simple for operators to deploy. On the other side, static association of flows to specific paths may be problematic because the flow's bandwidth consumption may change over time and is therefore difficult to predict. As a result, it is hard to guarantee the traffic balance among the different paths over time. In addition, in certain scenarios without a BGW, it may be difficult to guarantee that the upstream and downstream packets within the same flow are forwarded over the same path; as a result, it is difficult to guarantee service performance.

Referring again to flow-based traffic distribution, in which a first connection may be established over a first network and a second connection may be established over a second network, a distribution policy may be as simple as "forward Skype-like connections over the first network and web traffic over the second network" or as elaborate as solving an optimization problem where the network characteristics, associated costs, caps, etc., are considered and a residential gateway determines which connection should be established over which network. Alternatively, the gateway could implement "packet-based distribution," in which it has some knowledge of the Service Level Agreements ("SLAs") (like bandwidth, delay, loss, etc.) for both access networks send the packets of each connection appropriately over the two networks. On the other side of the access network, a hybrid access gateway that receives the packets forms the single connection that is forwarded to the ultimate destination.

Given a good residential gateway ("RG") and a good hybrid access gateway ("HAG"), implementation and the RG has a good insight into the network characteristic, hybrid access can make a sizable improvement in end user's experience. The RG can learn about its connected network's characteristics through probing, active measurements, passive measurements, and/or direct communication with the network elements/controllers. Better user experience could mean faster Web access, downloads, better Skype, better streaming, etc. However, the forwarding policies are quite naïve and/or simple and do not exploit the unique features of certain applications.

HTTP serves as a request-response protocol in a client-server computing model. In certain embodiments, the "client" may be a web browser installed on a host and an application residing on a computer hosting a web site may function as the "server." In operation, the client submits an HTTP request message to the server. The server, which provides content and/or performs functions on behalf of the client, returns a response message to the client. The response contains status information about the request and may also contain the requested content in the body of the message. HTTP is designed to permit intermediate network elements to improve or enable communications between clients and servers. HTTP resources are identified and located on a network by Uniform Resource Locators ("URLs") using Uniform Resource Identifier ("URI") schemes http and https. URIs and hyperlinks in Hypertext Markup Language ("HTML") document form inter-linked hypertext documents.

HTTP defines methods that indicate the desired action to be performed on the identified resource, which may be a file or the output of an executable that resides on the server. HTTP/1.0 defines a GET, POST, and HEAD methods, while HTTP/1.1 adds definitions of OPTIONS, PUT, DELETE, TRACE, and CONNECT methods. The semantics of these methods are well known; any client can use any method and any server can be configured to support any combination of methods. In particular, the GET method requests a representation of a specified resource. GET requests should only retrieve data and have no other effect.

Dynamic Adaptive Streaming over HTTP ("DASH") is an adaptive bitrate streaming technique that enables high quality streaming of media content over the Internet delivered from conventional HTTP web servers. DASH works by subdividing media content, which may be hours long in duration (e.g., a movie or live broadcast of an event) into a sequence of small HTTP-based file segments, each of which contains a short segment of the content. The content may be made available at a variety of different bit rates. While segments are being played on a DASH client, the client automatically selects from the alternative bit rate options the next segment to download and play back based on current network conditions. In particular, the client selects the highest possible big rate segment that can be downloaded in time for play back without causing stalls or re-buffering events in the playback. In this manner, a DASH client seamlessly adapts to changing network conditions while providing high quality play back with a minimum of stalls and/or rebuffering events.

Figure 4:
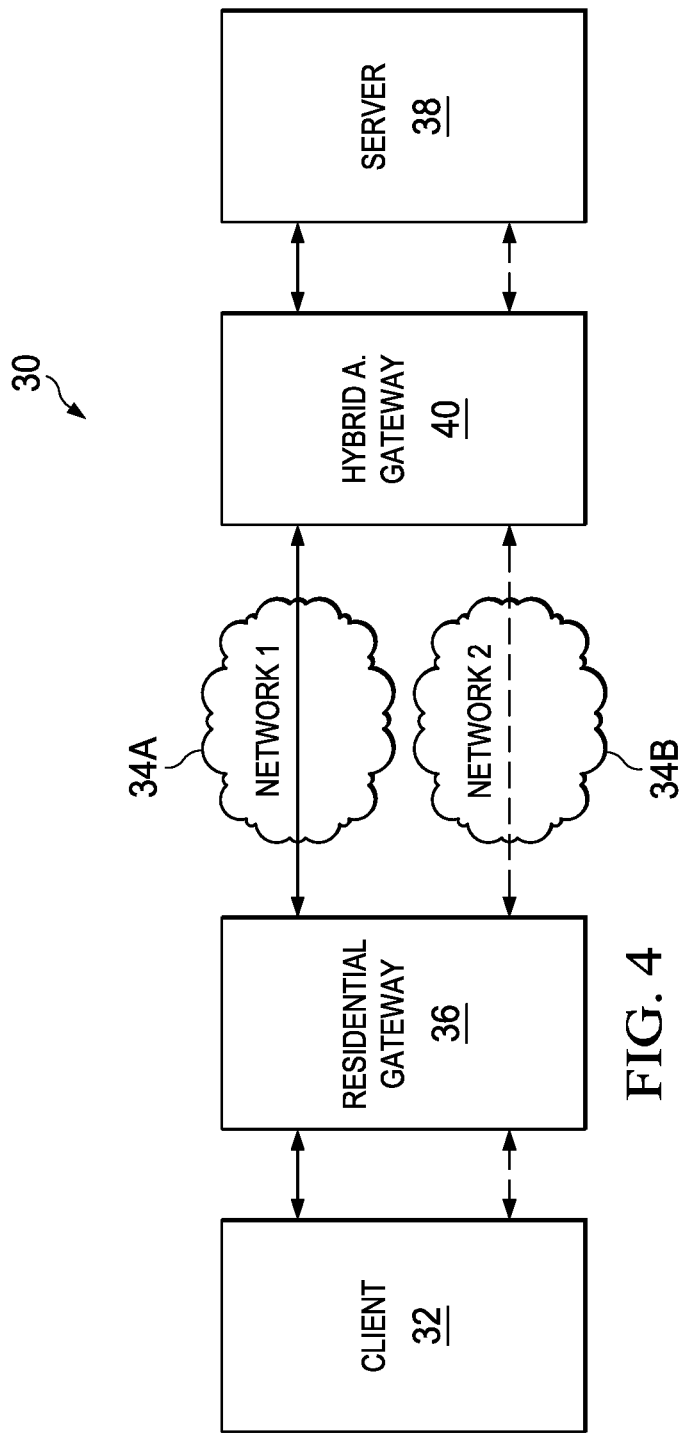
FIG. 4 illustrates a simplified block diagram of a hybrid access system environment in which embodiments described herein for HTTP support may be implemented.

Referring to FIG. 4, illustrated therein is a simplified block diagram of a hybrid access network 30. As shown in FIG. 4, a streaming client 32 is connected to a first access network 34A and a second access network 34B via a residential gateway 36. At an opposite end of the network 30, a server 38 is connected to the networks 34A, 34B via a hybrid access gateway 40. In some embodiments, the connection between the server 38 and the hybrid access gateway 40 may be implemented as an Internet connection. It will be assumed that the streaming client 32 is unaware of the residential gateway 36, as well as the hybrid access features. It will be further assumed that the streaming client 32 wants to stream video using HTTP adaptive streaming (or DASH) from the server 38 (which in alternative embodiments may be a Content Delivery Network ("CDN")). The desired content is encoded in multiple representations (e.g., bitrates) and each representation is chunked (i.e., segmented). The resulting chunks, or segments, for each representation are stored on the server. The client 32 can switch between representations at segment boundaries as each segment is requested individually by the client 32 through an HTTP GET request. Once the streaming starts, the client 32 receives a manifest file that describes the content, segments, and URLs, as well as providing other information. The client then begins sending an HTTP GET request, the server responds, and based on a number of observation and client's status/conditions, the client makes a subsequent request.

If the residential gateway 36 is unaware of HTTP streaming, a simple forwarding policy is to select one of the networks 34A, 34B to transmit the HTTP GET message and then receive the response over the same network. Based on the selected network's performance, the streaming experience may be bad or good but it will certainly not be optimal, since hybrid access features are not employed.

Figure 5:
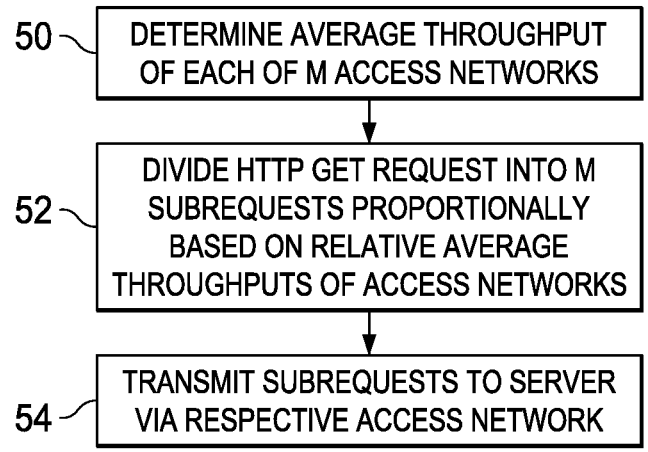
FIG. 5 is a flowchart of a method for HTTP support in a hybrid access system environment in accordance with embodiments described herein.

In one embodiment, when the residential gateway 36 receives an HTTP GET request from the client 32, the residential gateway 36 partitions the HTTP GET proportionally into M sub-requests (where M is the number of available access networks) and sends each sub-request over a different one of the networks 34A, 34B. A flowchart illustrating this method is shown in FIG. 5. Referring to FIG. 5, in step 50, the average throughput (in bits per second, or "bps") of each of the M access networks is determined. Referring to FIG. 4, it will be assumed for the sake of example that network 34A has a throughput of X bits per second and network 34B has a throughput of 2X per second. Once the average throughput of each network is determined in step 50, in step 52, a GET request received from a streaming client is divided proportionally into M=2 subrequests based on the relative average throughputs of the networks. Referring again to FIG. 4, assuming the residential gateway 36 receives a GET request for a 3X-bit object from the client 32, the original request would be divided as follows:

Subrequest 1 (to be sent over network 34A): request X bits

Subrequest 2 (to be sent over network 34B): request 2X bits

Referring again to FIG. 5, in step 54, the residential gateway 36 issues the subrequests to the server 38. It will be recognized that the subrequests may be generated with HTTP using HTTP byte-range rquests (using the Range: header). If the original request is an HTTP byte range request, partitioning of the two subrequests is trivial; otherwise, the residential gateway 36 issues its own HTTP HEAD message to the server 38 to learn the size of the object and can the generate the partiioned subrequests. The residential gateway 36 may also proactively issue a GET request while waiting for the HTTP HEAD in order to start retrieval quickly for the client 32. If the residential gateway 36 had not divided the original request, the download time for the client would be either 3 seconds (over network 34A) or 1.5 seconds (over network 34B). In the currently described embodiment, the download time is 1 second. In this embodiment, a hybrid access gateway is not needed on the other side of the network.

It will be noted that the residential gateway 36 may determine whether to split an incoming HTTP GET request is a couple of different ways. First, the residential gateway 36 could split the requests destined to well-known addresses (i.e., the ones that belong to domains like Netflix or Akamai, for example). Alternatively the residential gateway 36 could split the requests that are for large objects where hybrid access benefit will be sizable; there is no sizable benefit to splitting request for tiny objects). If the client is aware of the hybrid access, the request splitting may be performed by the client and the packets marked in such a way that the residential gateway 36 knows which one needs to be sent over which network 34A, 34B.

Another embodiment is a more elaborate version of the embodiment illustrated in FIG. 5 in which the original GET request is divided in M subrequests and each of the corresponding subrequests is sent to the server 38 over a different access network (e.g., networks 34A and 34B). For file-transfer-like applications, the embodiment illustrated in FIG.

Figure 6:
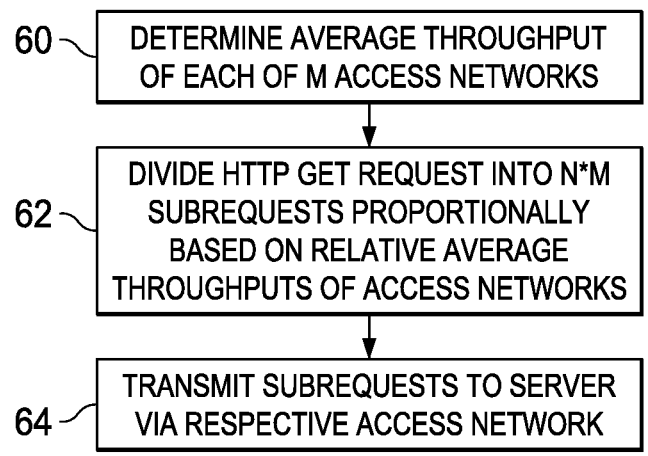
FIG. 6 is a flowchart of an alternative method for HTTP support in a hybrid access system environment in accordance with embodiments described herein.

5 works well, but for streaming or progressive download-like applications the performance may be further improved by splitting the original HTTP GET request into not M, but M*N requests, resulting in proportional requesting in smaller chunks, or segments. This alternative embodiment is illustrated in FIG. 6.

In step 60, the average throughput (in bps) of each of the access networks is determined. Referring to FIG. 4, it will again be assumed for the sake of example that network 34A has a throughput of X bits per second and network 34B has a throughput of 2X per second. Once the average throughput of each network is determined in step 60, in step 62, a GET request received from a streaming client is divided proportionally into M*N subrequests based on the relative average throughputs of the networks. Referring again to FIG. 4, assuming the residential gateway 36 receives a GET request for a 90 MB object from the client 32, using the embodiment illustrated in FIG. 4, the original request would be divided as follows:

Subrequest 1 (to be sent over network 34A): request 30 MB

Subrequest 2 (to be sent over network 34B): request 60 MB

In the embodiment illustrated in FIG. 4, M=2. It will be assumed for the sake of example that N is equal to 6. In contrast, in accordance with the embodiment illustrated in FIG. 6, rather than dividing the request into a 30 MB subrequest and a 60 MB subrequest, the request is divided into six 5 MB subrequests (to be sent over network 34A) and six 10 MB subrequests (to be sent over network 34B). This enables faster access to the content in applications that are capable of using subsegment data, for example, where the content can be used to initialize the decoder and start the decoding process. This way, faster zapping, or playback start, may be achieved. Referring again to FIG. 6, in step 64, the residential gateway 36 issues the subrequests to the server 38.

If the residential gateway 36 is unaware about the bandwidth differences of the networks 34A, 34B, it can issue a GET request at the same time over both networks. Soon after, it can infer which network 34A, 34B is providing what bandwidth. It may try and cancel the GET request over the small network and then issue another request that will request a smaller amount of data. In HTTP 1.1, canceling the GET would be accomplished by sending a TCP RST message. In HTTP/2, an RST STREAM message would be used.

In yet another embodiment, it will be assumed that the residential gateway 36 has storage. This allows the residential gateway 36 to request and store the objects that will potentially be requested by the streaming client 32 in the near future. For example, the client 32 may generate a request for segment #3, which request may be communicated over network 34A. While the response is on its way, the residential gateway 36 can proactively generate a request for segment #4, which request may be communicated over network 34B, such that segment #4 is retrieved at roughly the same time as segment #3. When/if the actual request is made for segment #4 by the client, the residential gateway can respond from its storage, which may be implemented as memory or disk storage.

If the original request is a byte-range request, the residential gateway can readily issue another byte-range request based on the other network's bandwidth. The residential gateway 36 should not prefetch too much data proactively to minimize the risk of wasting it; rather, it should use proactive prefetching to the extent that the client feels that it has an available bandwidth corresponding to the aggregate bandwidth of both networks, which would translate into better quality streaming. If the client does not request the prefetched content stored in storage thereof, the content should be discarded rather quickly to minimize the storage requirements. If the original request is a byte-range request, the residential gateway has to understand the requested URL pattern and make a prefetching request accordingly.

In the above-described scenario, it is assumed that there is a separate physical entity for the client and the residential gateway and that the streaming application runs on the client. In practice, however, the client and residential gateway function may reside on the same physical device and the client and residential gateway may communicate with one another through a set of Application Programming Interfaces ("APIs") and/or protocols Also, in certain embodiments, it is not necessary to implement a hybrid access gateway; i.e., the hybrid access gateway is optional.

In certain embodiments, when the client running the streaming application is unaware of the hybrid access, the residential gateway is used to obtain the benefits thereof. In this manner, regardless of the specific streaming protocol of a particular client, the benefits of hybrid access may be realized. On the other hand, if the client or the streaming application aware of hybrid access, embodiments described herein may be implemented directly within the client or application.

In one example implementation, various network nodes, and particularly the residential gateway 36 and the hybrid access gateway 38, can include software for achieving the described functions. For example, referring to FIG. 7, one or more such network nodes for implementing the embodiments described herein, represented in FIG. 7 by a node 70, may include an HTTP support module 72, which comprises software embodied in one or more tangible media for facilitating the activities described herein. In particular, the HTTP support module 72 comprises software for facilitating the processes illustrated in and described with reference to FIGS. 5 and 6. The node 70 may also include a memory device 74 for storing information to be used in achieving the functions as outlined herein. Additionally, the node 70 may include a processor 76 that is capable of executing software or an algorithm (such as embodied in module 72) to perform the functions as discussed in this Specification.

Figure 7:
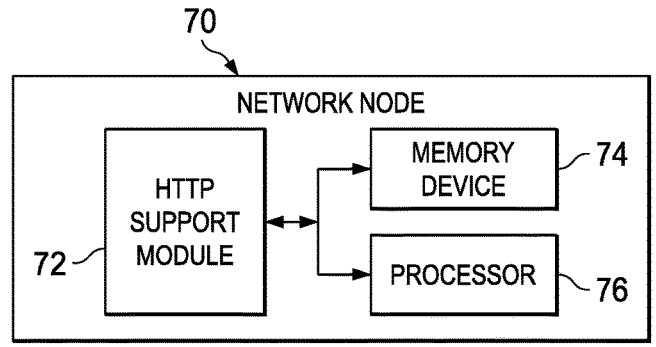
FIG. 7 is a simplified block diagram a network node configured for HTTP support in a hybrid access system environment in accordance with embodiments described herein.

Although the embodiments are described with reference to wireless communications network, it will be recognized that the techniques are equally applicable to other network technologies. In one example implementation, various devices involved in implementing the embodiments described herein can include software for achieving the described functions. For example, as shown in FIG. 7, the nodes may be implemented using one or more computer devices comprising software embodied in one or more tangible media for facilitating the activities described herein. The computer device for implementing the transmitter and receiver elements may also include a memory device (or memory element) for storing information to be used in achieving the functions as outlined herein. Additionally, the computer device for implementing the transmitter and receiver elements may include a processor that is capable of executing software or an algorithm to perform the functions as discussed in this Specification, including but not limited to the functions illustrated in and described with reference to FIGS. 5 and 6. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and specifically illustrated in FIGS. 5 and 6 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification, including but not limited to the functions illustrated in and described with reference to FIGS. 5 and 6. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Figure 8:
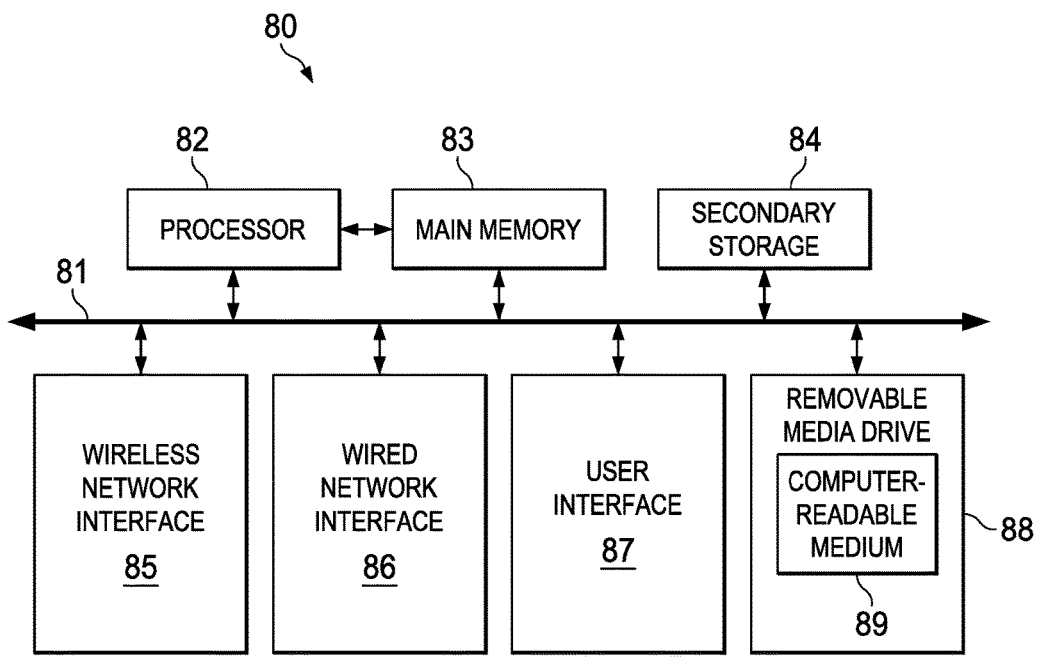
FIG. 8 is a simplified block diagram of a machine comprising an element of the hybrid access system environment of FIG. 4 for supporting HTTP access in a hybrid access system environment in accordance with embodiments described herein.

Turning to FIG. 8, FIG. 8 illustrates a simplified block diagram of an example machine (or apparatus) 80, which in certain embodiments may a base station and/or centralized network node, such as a C-SON, that may be implemented a system for mitigating interference in a HetNet in accordance with features of embodiments described herein. The example machine 80 corresponds to network elements and computing devices that may be deployed in networks 10, 100, including, for example, base stations and C-SON. In particular, FIG. 8 illustrates a block diagram representation of an example form of a machine within which software and hardware cause machine 80 to perform any one or more of the activities or operations discussed herein. As shown in FIG. 8, machine 80 may include a processor 82, a main memory 83, secondary storage 84, a wireless network interface 85, a wired network interface 86, a user interface 87, and a removable media drive 88 including a computer-readable medium 89. A bus 81, such as a system bus and a memory bus, may provide electronic communication between processor 82 and the memory, drives, interfaces, and other components of machine 80.

Processor 82, which may also be referred to as a central processing unit ("CPU"), can include any general or special-purpose processor capable of executing machine readable instructions and performing operations on data as instructed by the machine readable instructions. Main memory 83 may be directly accessible to processor 82 for accessing machine instructions and may be in the form of random access memory ("RAM") or any type of dynamic storage (e.g., dynamic random access memory ("DRAM")). Secondary storage 84 can be any non-volatile memory such as a hard disk, which is capable of storing electronic data including executable software files. Externally stored electronic data may be provided to computer 80 through one or more removable media drives 88, which may be configured to receive any type of external media such as compact discs ("CDs"), digital video discs ("DVDs"), flash drives, external hard drives, etc.

Wireless and wired network interfaces 85 and 86 can be provided to enable electronic communication between machine 80 and other machines, or nodes. In one example, wireless network interface 85 could include a wireless network controller ("WNIC") with suitable transmitting and receiving components, such as transceivers, for wirelessly communicating within a network. Wired network interface 86 can enable machine 80 to physically connect to a network by a wire line such as an Ethernet cable. Both wireless and wired network interfaces 85 and 86 may be configured to facilitate communications using suitable communication protocols such as, for example, Internet Protocol Suite ("TCP/IP"). Machine 80 is shown with both wireless and wired network interfaces 85 and 86 for illustrative purposes only. While one or more wireless and hardwire interfaces may be provided in machine 80, or externally connected to machine 80, only one connection option is needed to enable connection of machine 80 to a network.

A user interface 87 may be provided in some machines to allow a user to interact with the machine 80. User interface 87 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 88 represents a drive configured to receive any type of external computer-readable media (e.g., computer-readable medium 89). Instructions embodying the activities or functions described herein may be stored on one or more external computer-readable media. Additionally, such instructions may also, or alternatively, reside at least partially within a memory element (e.g., in main memory 83 or cache memory of processor 82) of machine 80 during execution, or within a non-volatile memory element (e.g., secondary storage 84) of machine 80. Accordingly, other memory elements of machine 80 also constitute computer-readable media. Thus, "computer-readable medium" is meant to include any medium that is capable of storing instructions for execution by machine 80 that cause the machine to perform any one or more of the activities disclosed herein.

Not shown in FIG. 8 is additional hardware that may be suitably coupled to processor 82 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 80 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 80 to appropriately manage the operation of the hardware components therein.

The elements, shown and/or described with reference to machine 80, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities described herein related to techniques for enabling packet prioritization without starvation in data center networks may be implemented in software in, for example, base stations and C-SON. In some embodiments, this software could be received or downloaded from a web server, provided on computer-readable media, or configured by a manufacturer of a particular element in order to implement the embodiments described herein. In some embodiments, one or more of these features may be implemented in hardware, provided external to these elements, or consolidated in any appropriate manner to achieve the intended functionality.

In one example implementation, base station and C-SON are network elements or computing devices, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments described and illustrated herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 83, secondary storage 84, computer-readable medium 89) can store data used in implementing embodiments described and illustrated herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 82) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of the network 10, 110, may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environment 10, 110, could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    receiving at a first network node a request to obtain data from a second network node, wherein the first and second network nodes are connected via n access networks;
    partitioning the request into n subrequests proportionally based on relative throughputs of the n access networks;
    subdividing each of the subrequests into smaller subrequests before the transmitting; and
    transmitting each of the smaller subrequests to the second network node via a respective one of the n access networks.

2. The method of claim 1, wherein the request is an HTTP GET request.

3. The method of claim 1, wherein n is equal to 2 and wherein a first one of the access networks comprises a fixed access network and a second one of the access networks comprises a high-speed mobile access network.

4. The method of claim 1, wherein the second network node comprises one of a hybrid access gateway, a server, and a content delivery network ("CDN").

5. A method comprising:
    receiving at a first network node a request from a client to obtain a first data segment from a second network node, wherein the first and second network nodes are connected via first and second access networks;
    generating a request to obtain a second data segment from the second network node;
    subdividing the request to obtain the first data segment into first smaller requests;
    subdividing the request to obtain the second data segment into second smaller requests;
    transmitting the first smaller requests to obtain the first data segment via the first access network and the second smaller requests to obtain the second data segment via the second access network;
    receiving at the first network node the first data segment and the second data segment;
    forwarding the first data segment to the client; and
    storing the second data segment in a storage device at the first network node.

6. The method of claim 5 further comprising:
    receiving at the first network node a request from the client for the second data segment;
    retrieving the second data segment from the storage device at the first network node; and
    transmitting the second data segment to the client.

7. One or more non-transitory tangible media having encoded thereon logic that includes code for execution and when executed by a processor is operable to perform operations comprising:
    receiving at a first network node a request to obtain data from a second network node, wherein the first and second network nodes are connected via n access networks;
    partitioning the request into n subrequests proportionally based on relative throughputs of the n access networks;
    subdividing each of the subrequests into smaller subrequests before the transmitting; and
    transmitting each of the smaller subrequests to the second network node via a respective one of the n access networks.

8. The media of claim 7, wherein the request is an HTTP GET request.

9. The media of claim 7, wherein n is equal to 2 and wherein a first one of the access networks comprises a fixed access network and a second one of the access networks comprises a high-speed mobile access network.

10. An apparatus comprising:
    a memory element configured to store data;
    a processor operable to execute instructions associated with the data; and
    an HTTP support module configured to:
        receive at a first network node a request to obtain data from a second network node, wherein the first and second network nodes are connected via n access networks;

partition the request into n subrequests proportionally based on relative throughputs of then access networks;

subdivide each of the subrequests into smaller subrequests before the transmitting; and transmit each of the smaller subrequests to the second network node via a respective one of the n access networks.

11. The apparatus of claim 10, wherein the request is an HTTP GET request.

12. The apparatus of claim 10, wherein n is equal to 2 and wherein a first one of the access networks comprises a fixed access network and a second one of the access networks comprises a high-speed mobile access network.

13. The apparatus of claim 10, wherein the first network node comprises a residential gateway.

14. The apparatus of claim 10, wherein the second network node comprises one of a hybrid access gateway, a server, and a content delivery network ("CDN").

15. The method of claim 1, further comprising:
receiving a second request to obtain data from a third network node;
determining the second request is for a small object; and
sending the second request to the third network node without partitioning the second request in response to the determining.

16. The method claim 1, wherein receiving the request comprises receiving a request from an application using subsegment data; and wherein subdividing each of the subrequests into smaller subrequests before the transmitting comprises generating at least one smaller subrequest for data used to initialize a decoder of the application.

17. The method of claim 1, wherein receiving the request at the first network node comprises receiving the request at a residential gateway.

18. The method of claim 5, wherein receiving the request to obtain the first data segment comprises receiving a request from an application using subsegment data; and wherein subdividing the request to obtain the first data segment into first smaller requests comprises generating at least one of the first smaller requests as a request for data used to initialize a decoder of the application.

19. The method of claim 5, wherein receiving the request to obtain the first data segment at the first network node comprises receiving the request to obtain the first data segment at a residential gateway.

20. The media of claim 7, wherein the operations further comprise:
receiving a second request to obtain data from a third network node;
determining the second request is for a small object; and
sending the second request to the third network node without partitioning the second request in response to the determining.

* * * * *